United States Patent [19]

Novotny

[11] 4,387,399

[45] Jun. 7, 1983

[54] POWER SUPPLY SWITCHING-REGULATOR PARTICULARLY FOR TELEVISION RECEIVERS

[75] Inventor: Bernd Novotny, Gundelfingen, Fed. Rep. of Germany

[73] Assignee: ITT Industries, Inc., New York, N.Y.

[21] Appl. No.: 278,940

[22] Filed: Jun. 30, 1981

[30] Foreign Application Priority Data

Jul. 8, 1980 [DE] Fed. Rep. of Germany ....... 3025719

[51] Int. Cl.³ .......................... H04N 3/18; H01J 29/70
[52] U.S. Cl. ..................................... 358/190; 315/411
[58] Field of Search ................ 358/190; 315/411, 408; 323/282, 283

[56] References Cited

U.S. PATENT DOCUMENTS 3,970,919 7/1976 Butcher ............................. 323/283

Primary Examiner—John C. Martin
Attorney, Agent, or Firm—John T. O'Halloran; Peter C. Van Der Sluys

[57] ABSTRACT

Switch-mode power supply generating a variable pulse-width modulating signal by digital control techniques synchronized with the horizontal line rate of the receiver. Logic circuits operating against fixed references provide overload and short-circuit protection by rapidly decreasing the variable pulse-width signal duration during various fault conditions.

5 Claims, 5 Drawing Figures

POWER SUPPLY SWITCHING-REGULATOR PARTICULARLY FOR TELEVISION RECEIVERS

BACKGROUND OF THE INVENTION

1. Field of the Invention

The invention relates to switching-mode regulated power supplies.

2. Description of the Prior Art

Regulating devices of the general category into which the invention falls are known per se in the prior art. Such regulators employ a power-switching semiconductor device which is periodically switched on and off (conducting and non-conducting states) by a variable duration control or gating signal. The pulse-width modulation thus achieved is a function of a nominal (or reference) to actual comparison performed during each period (time of each horizontal line in the television receiver case) and thus is line synchronous.

Switching regulators of the type can be implemented in integrated circuit form and have been so described, for example in the well known "Electronic Design" (periodical) of Jan. 18, 1980, pp 94 to 101, and also of Feb. 1, 1979, pp 102. Those references describe switching type regulators which generate pulse-width modulated control signals using analog techniques to make the nominal/actual regulated voltage comparison. Generally in those devices a sawtooth generator serves as the reference voltage, preferably synchronous with the horizontal line rate.

In German patent specification DE-OS No. 28 43 988 a switching-type regulator which develops a pulse-width modulated signal for a power semiconductor is described, however that device relies on a clock pulse cadence without synchronization to a signal such as the horizontal drive of a television receiver. Such additional synchronization is important in the television receiver art as are certain other requirements, including high speed regulation response (during the individual horizontal line period). The microprocessor of DE-OS 28 43 988 could not provide the required speed of regulation response. Other rapid acting features such as overload and short-circuit protection are absent from the aforementioned prior art. Even if added, for example to DE-OS No. 28 43 988, the speed of response in such a combination would preclude use in the television receiver case.

The manner in which the invention deals with the prior art disadvantages to provide a novel combination (particularly effective in the television receiver case) will be understood as this description proceeds.

SUMMARY OF THE INVENTION

It may be said to be the object of the invention to further develop the integrated switching regulator art as known from the described prior art by applying digital principles to the unique requirement of television receivers. Accordingly, the solution to the given problem consists of novel application of measures partly known from the aforementioned German patent specification with further means hereinafter described to produce a novel combination. Accordingly, for solving the given problem only such basic digital circuits as counters and digital logic elements which, in their particular circuit-technical logic combination are suitable for solving the particular regulating problem, are required. Novel circuits for generating the required pulse-width modulated control signal and for determining the regulating deviation in each line of the television picture are provided.

The further embodiments of the invention as set forth in the dependent claims, extend the principle of the invention defined in claim 1, by the additional functions of the so-called electronic fuse for disconnecting the switching regulator or controlling it back into a non-dangerous load current range whenever a short-circuit or an overload occurs. These additional functions are likewise realized with the aid of digital circuit and operational principles and, accordingly, differ from conventional arrangements operating in accordance with analog principles.

The subject matter of the invention and the further embodiments thereof will be explained in greater detail with reference to FIGS. 1 to 5 of the accompanying drawings.

DETAILED DESCRIPTION OF THE PREFERRED EMBODIMENTS

Figure 1:
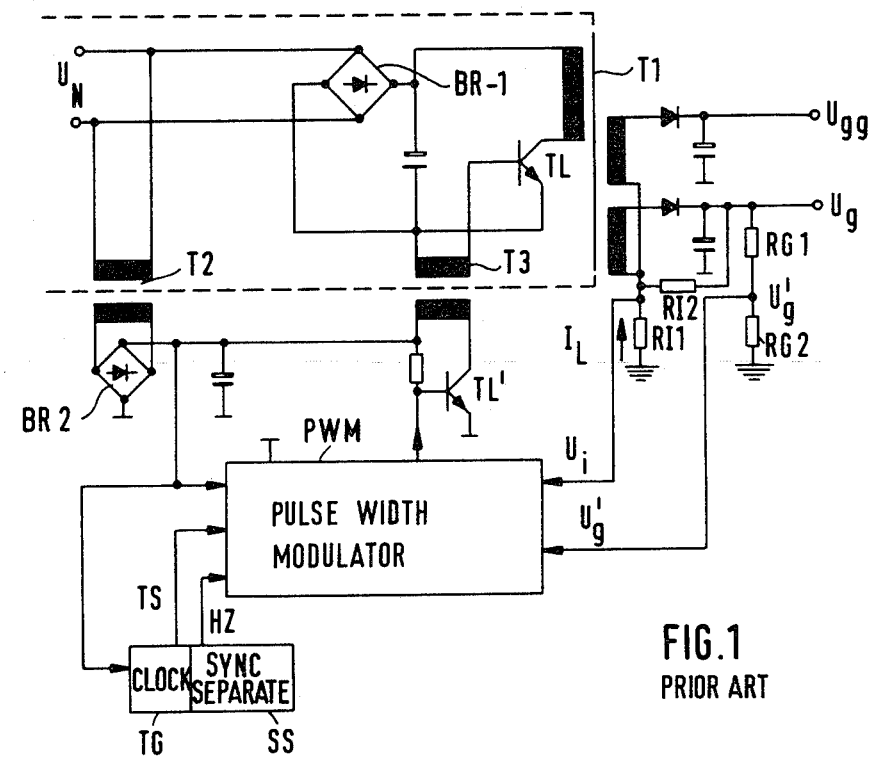
FIG. 1 is a basic circuit diagram showing the power supply unit of a television receiver employing the circuit arrangement according to the invention.

FIG. 1 shows the power supply unit of a television receiver employing a conventional switching regulator. For the purposes of description, the substantial parts of this basic circuit diagram are indicated by references. Thus, the a.c. main voltage $U_N$ is applied via a rectifier bridge BR1 and the power switching semiconductor device TL, to the primary winding of a main transformer T1. A further, small transformer T2 supplies a further rectifier BR2 from which there is taken the supply voltage for the switching regulator. As is indicated by the dashlines, the a.c. main voltage is isolated from the d.c. voltage side, as is often required by governmental standards.

On the side separated from the main, there is shown the semiconductor device TL' which is controlled by the pulse-width modulator PWM and, via the associated, further transformer T3, acts upon the aforementioned power-switching semiconductor device TL in the known manner. Pursuant to this, a.c. voltages are generated to the two shown secondary windings of T1 in accordance with the converter principle known from so-called blocking oscillator DC converters and which, when rectified, result in the regulated voltages $U_g$ and $U_{gg}$. At the tapping point between the voltage divider RG1/RG2 (connected between the regulated voltage $U_g$ and chassis ground) there is taken off the voltage $U'_g$ which is in proportion to $U_g$ and is fed to the pulse-width modulator PWM serving as an information signal relating to the actual value of $U_g$. Moreover, with the aid of the ground side series current-measuring resistor RI1, there is measured a load current $I_L$ which flows in the load circuit. The voltage drop across RI1 is likewise fed to the pulse-width modulator for serving as an information signal $U_i$, relating to the said load current. The tapping point for the current representing signal $U_i$, i.e. the point connecting the secondary windings to the current-measuring resistor RI1, is also applied across the resistor RI2 to the regulated voltage $U_g$, so that this connecting point is also referenced to that voltage.

FIG. 1 also shows a clock-pulse generator TG whose output signal is fed to the pulse-width modulator PWM, i.e. serving as the source of clock signal TS. Horizontal sync pulses HZ originate with the synchronizing signal separating stage SS of the television receiver in the conventional manner.

FIG. 1, while showing the general prior art configuration, also shows integration of the apparatus of the invention into a regulator with a.c. main isolation and other common interconnections.

Figure 2:
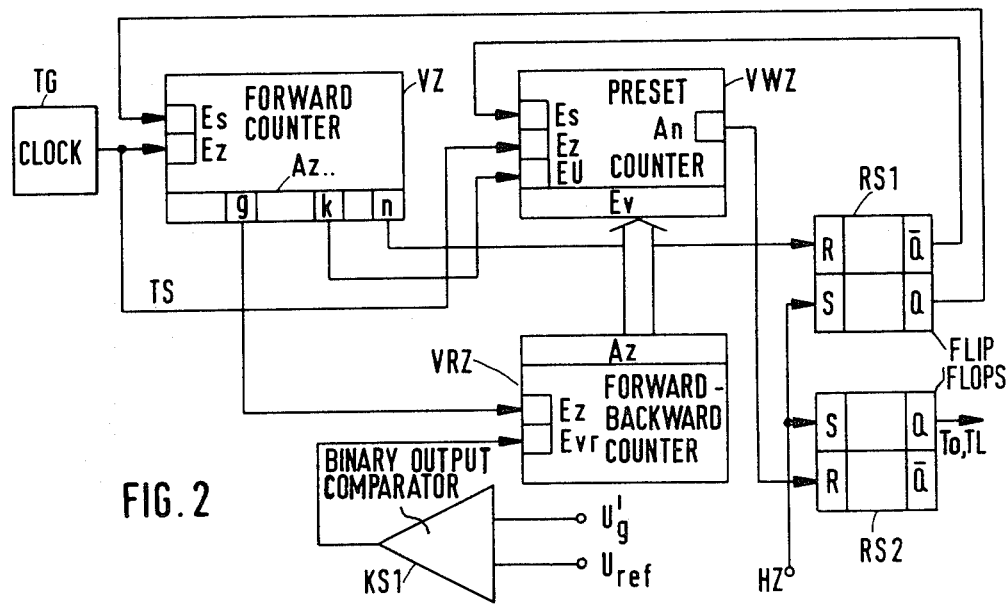
FIG. 2 is a block diagram showing the basic design of the invention.

FIG. 2 depicts a basic arrangement for a pulse-width modulator PWM according to FIG. 1. The pulse-width modulating signal is generated with the aid of digital circuits, driven as a function of the period of the clock signal. For the clock pulse generator TG a crystal oscillator frequency of four times the color subcarrier frequency of color television receivers, i.e. 17.7 MHz, is required.

The nominal-actual value comparison is carried out by the first digital comparator stage KS1 to the first input of which there is applied reference voltage $U_{ref}$ and to the second input of which voltage $U'_g$ is applied. $U'_g$ is in proportion to the regulated voltage $U_g$ according to FIG. 1. The reference voltage $U_{ref}$ can be generated in any of the conventional ways, hence for example with the aid of a zener diode, possibly temperature-compensated. The first digital comparator KS1 generates at its output a binary signal of two possible values, i.e. a level H associated with a predetermined positive voltage value or a level L associated with a voltage value which is comparatively lower. These outputs of KS1 are associated with the two input signal ranges $U_{ref} > U'_g$ or $U_{ref} < U'_g$, respectively. The variable-gain amplifier as customarily used in prior art analog regulating circuits, is replaced in the circuit of the invention by the comparator stage KS1 which supplies the aforementioned binary signal with respect to the falling short or exceeding of the reference voltage $U_{ref}$ vis-a-vis the voltage $U'_g$. It will be subsequently seen that other digital comparator stages which are included in the additional embodiment described are also such stages having a binary signal output.

The clock-pulse generator TG is connected to the counter input Ez of the forward counter VZ having a counting capacity n and to the counter input Ez of the preset counter VWZ. Accordingly, the pulses of the clock signal TS are counted wth the aid of these two counters during predetermined periods of time to be defined hereinafter.

Of the Az plural counter outputs (g---k---n, etc.) of the forward counter VZ, some are used for deriving control signals for the preset counter VWZ as well as for the forward/backward counter VRZ as shown. Thus, the counter reading output g of the AZ outputs is applied to the counting input Ez of the forward/backward counter VRZ which, accordingly, counts these output pulses of the forward counter VZ either in the forward or the backward direction, with the output signal of the first comparator stage KS1, via the switching input Evr, fixing the counting direction (sense). The counter reading outputs Az of the forward/backward counter VRZ are connected in parallel digital form to the presetting inputs Ev of the preset counter VWZ, which is indicated by the broad arrow in FIG. 2. Accordingly, the counter reading which is reached at predetermined time positions in the forward/backward counter VRZ, is read into the preset counter VWZ where it serves to determine the duration of a particular counting cycle. The preset counter VWZ may be either a forward counter which, by starting from the preset counter reading, counts up to a certain higher counter reading (count) and then, by serving as a zero crossover output An, transmits to the particular counter reading output an impulse. Also, it may be a backward counter which, by starting from the preset counter reading, counts back to zero and then transmits a zero crossing output impulse at that corresponding time.

The enable input Eu of the preset counter VWZ is applied from one of the other outputs, namely to the output k of the Az outputs of the forward counter VZ. Therefore, when this counter has reached the count k, the count reached at this particular time position in the forward/backward counter, is taken over as the presetting count into the preset counter VWZ.

The n-th counter reading output (n of Az) of the forward counter VZ is connected to the R-input of the first RS flip-flop RS1 whose Q-output is applied to the starting and releasing input Es of the forward counter VZ while the Q-output is connected to the starting and releasing input Es of the preset counter VWZ. To the S-input of the first RS flip-flop RS1 there are applied the conventional horizontal sync pulses HZ. At the beginning of each horizontal pulse, the first RS flip-flop RS1 is thus set, and by the corresponding Q-signal, the forward counter VZ is started. Upon reaching its n-th counter reading (count) the first RS flip-flop RS1 is reset again, so that on one hand the forward counter VZ is prevented from counting further and, on the other hand, and via the Q-signal, the preset counter VWZ is started.

The zero crossing output An of the preset counter VWZ is connected to the R-input of the second RS flip-flop RS2. The S-input of RS2 receives the horizontal sync pulses HZ. Accordingly, this flip-flop, as was the case with RS1, is set by each horizontal pulse, and is reset upon reaching the zero crossing of the preset counter VWZ. Accordingly, at the Q-output of the second RS flip-flop RS2 there appears a pulse which is the pulse-width modulated pulse for controlling the power switching semiconductor device TL (see FIG. 1).

Accordingly, this control pulse is composed, with respect to time, of a first part which is determined by the counting capacity n of the forward counter VZ, and of a second part which is determined by the counter reading (count) given at the enable time position by the counter reading (count) of the forward/backward counter VRZ. Considering, however, that this counter reading (count) is influenced by the nominal/actual comparison, the intended regulating effect will result therefrom. The pulse-width modulated signal thus has a minimum pulse width which is determined by the forward counter VZ, and a maximum pulse width which is determined by the counting capacities of both the forward counter VZ and the forward/backward counter VRZ. The counting capacities of the three counters VZ, VWZ, VRZ, taking into consideration the frequency of the clock pulse generator TG and the line duration, are chosen such that the maximum pulse width of the pulse-width modulated signal does not exceed a predetermined portion of the television horizontal line duration, e.g., 44 μs.

Figure 3:
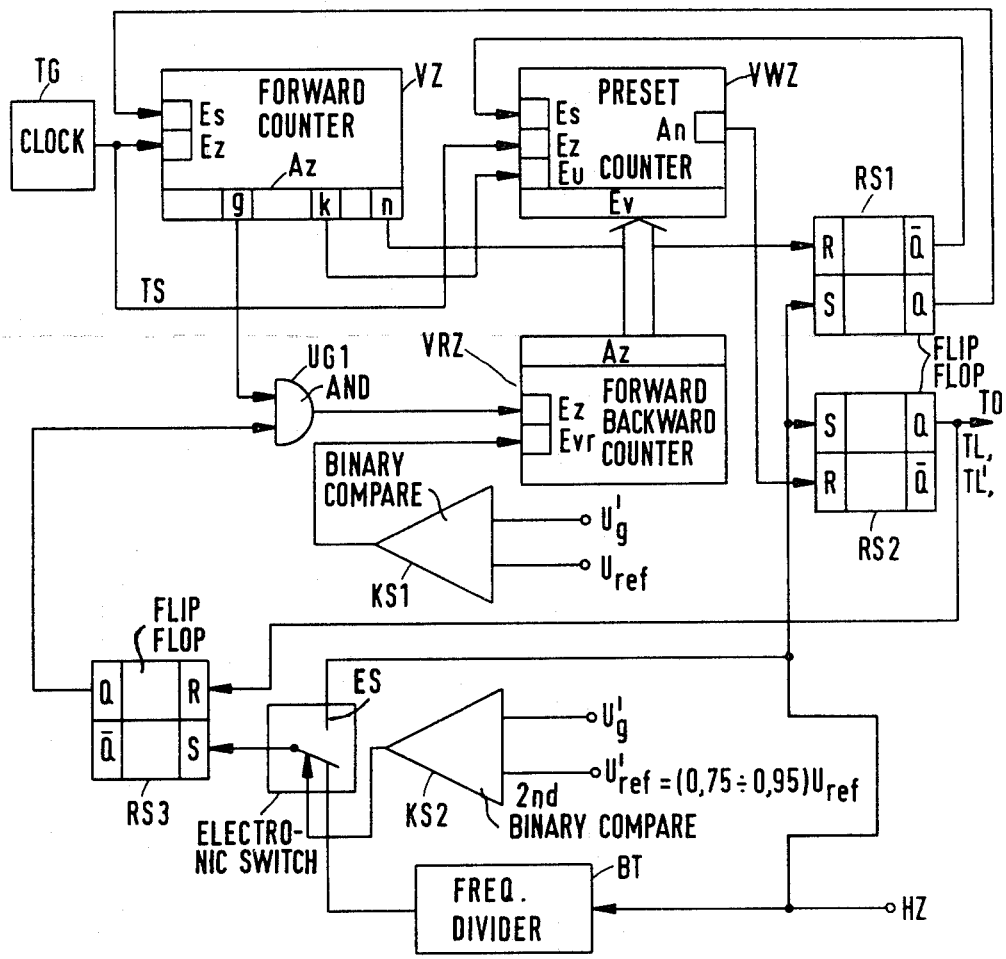
FIG. 3 shows a further embodiment of the arrangement according to FIG. 2 for starting operation upon switching on the supply voltage.

FIG. 3 shows a variation of the arrangement according to FIG. 2 containing additional circuit parts operative during the starting phase of the switching regulator upon switching on the main voltage. For this purpose there is provided a second digital comparator stage KS2 which compares the voltage $U'_g$ with a reference voltage $U'_{ref}$ amounting to approximately 0.75 to 0.95 times the reference voltage $U_{ref}$. Hence, when the voltage $U'_g$ which is in proportion to the regulated voltage $U_g$, is by 5 to 25% below its nominal value, the second comparator stage KS2 transmits one binary signal level and, above this range, the other binary signal level. These two signal levels jointly control the switching position of the electronic switch ES. The KS2 output is also applied to the S-input of the third RS flip-flop RS3. To the one input of the electronic switch ES there are applied the horizontal sync pulses HZ and, to the other input, the output of the frequency divider BT which divides the horizontal sync pulses HZ down to a lower frequency.

The R-input of the third RS flip-flop RS3 is applied from the Q-output of the second RS flip-flop RS2, and thus receives the pulse-width modulated pulse. The Q-output of the third RS flip-flop RS3 is applied to one input of the first AND-gate UG1. The other input of UG1 is responsive to the output g (of Az) of the forward counter VZ, the input Ez of the forward/backward counter VRZ receiving the output of UG1.

During the starting phase, i.e. as long as the voltage $U'_g$ is smaller than the range 75% to 95% of its nominal value, the third RS flip-flop RS3 is set by horizontal pulses reduced by the dividing factor of the frequency divider BT. Thus, via the first AND-gate UG1, the counting pulses are permitted to pass through to the forward/backward counter VRZ. Accordingly, the change of the counter reading Az thereof is effected substantially more slowly, i.e. the pulse-width modulated signal is changed during the starting phase not during the period of each line, but only during the period of each r-th line, when r indicates the divisor of the frequency divider BT.

If, however, the actual value of the voltage $U'_g$ reaches and exceeds the reference voltage $U'_{ref}$, the horizontal sync pulses HZ are directly applied to the S-input of the third RS flip-flop RS3 through ES, so that operation according to FIG. 2 will result, since during each sync pulse the output pulses of the counter reading output g of Az of the forward counter VZ are applied to the counting input Ez of the forward/backward counter VRZ. The other elements and functions of the device of FIG. 3 duplicate those of FIG. 2.

Figure 4:
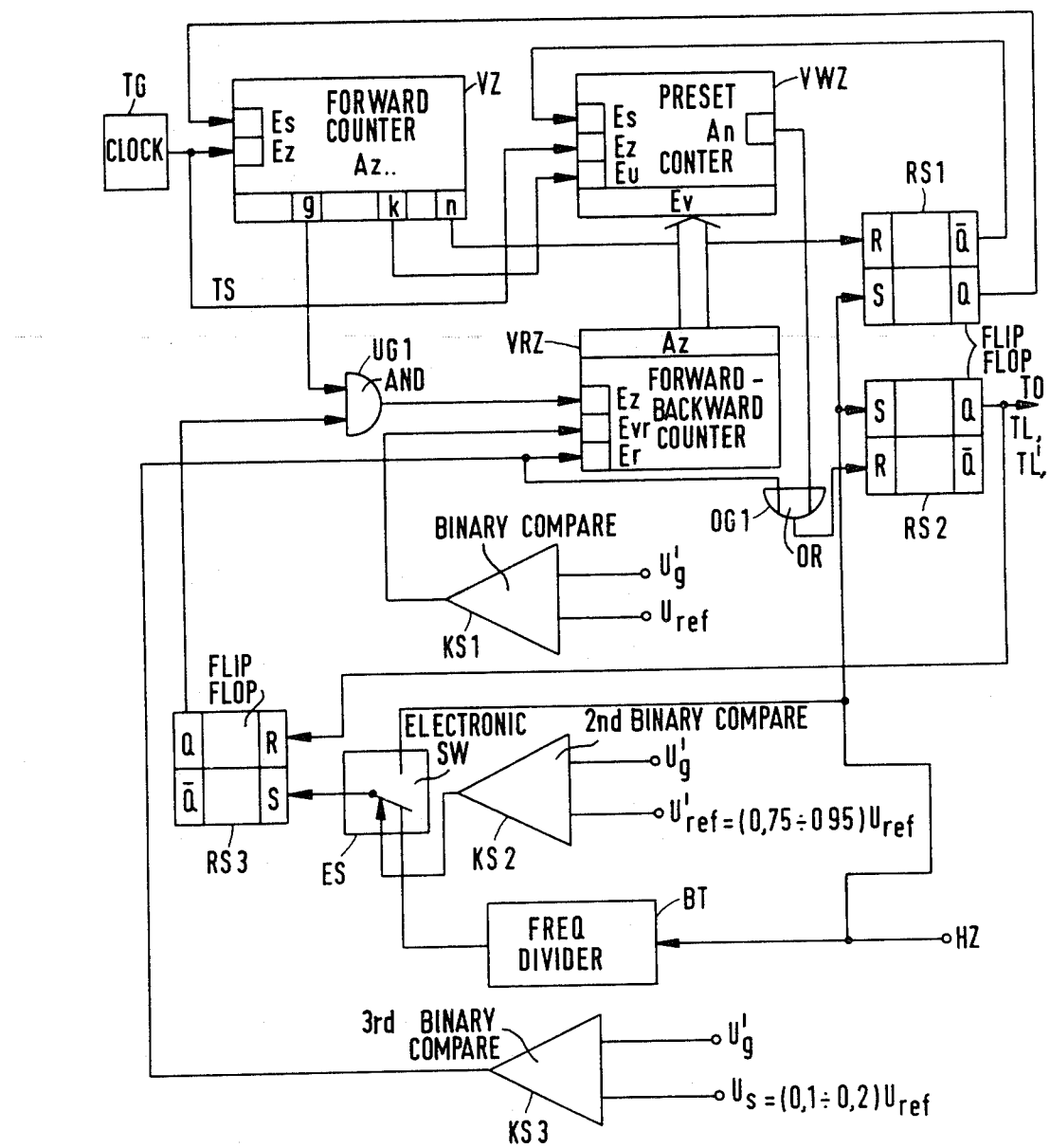
FIG. 4 shows a further embodiment of the arrangement according to FIG. 3 with a short-circuit protector in the measuring circuit.

FIG. 4 shows a further variation of the arrangement of FIG. 3 which adds a third digital comparator stage KS3 and a first OR-gate OG1. These two additional circuit parts may also be provided in the arrangement according to FIG. 2, without the additional circuit parts of FIG. 3. The FIG. 4 additions relate to short-circuit protection of the regulating circuit and are thus capable of being used independently of the starting circuit according to FIG. 3.

In FIG. 4, the third comparator stage KS3 compares the voltage $U'_g$ (derived as in FIG. 1) which is proportional to the regulated voltage $U_g$ with the fixed voltage $U_s$ of a first voltage threshold amounting to approximately 0.1 to 0.2 times the reference voltage $U_{ref}$. The output signal of the third comparator stage KS3 is applied to the forward/backward counter VRZ which is now provided with reset input signal Er via the first OR-gate OG1. This first OR-gate OG1 is connected with its other input from zero crossing output An of the preset counter VWZ and its output to the R-input of the second RS flip-flop RS2.

If a short-circuit occurs in the measuring circuit of the regulating arrangement (short-circuit of RG2), the forward/backward counter VRZ is reset to zero by the output signal of the third comparator stage KS3 thus also effecting zero set of preset counter VWZ after the next enable pulse. In addition thereto, by this output pulse of the third comparator stage KS3, the second RS flip-flop RS2 (determining the duration of the pulse-width modulated signal) is reset (via OG1) thus also reducing the output pulse duration (Q of RS2) immediately to the minimum duration.

This regulating loop protection becomes effective without delay immediately upon occurrence of the short-circuit, and is maintained for the time duration of the short-circuit. Moreover, the short-circuit protection is automatically rendered ineffective upon elimination of the short-circuit, i.e. there is provided in this way the mode of operation of a so-called electronic fuse or circuit breaker with automatic reclosing.

Figure 5:
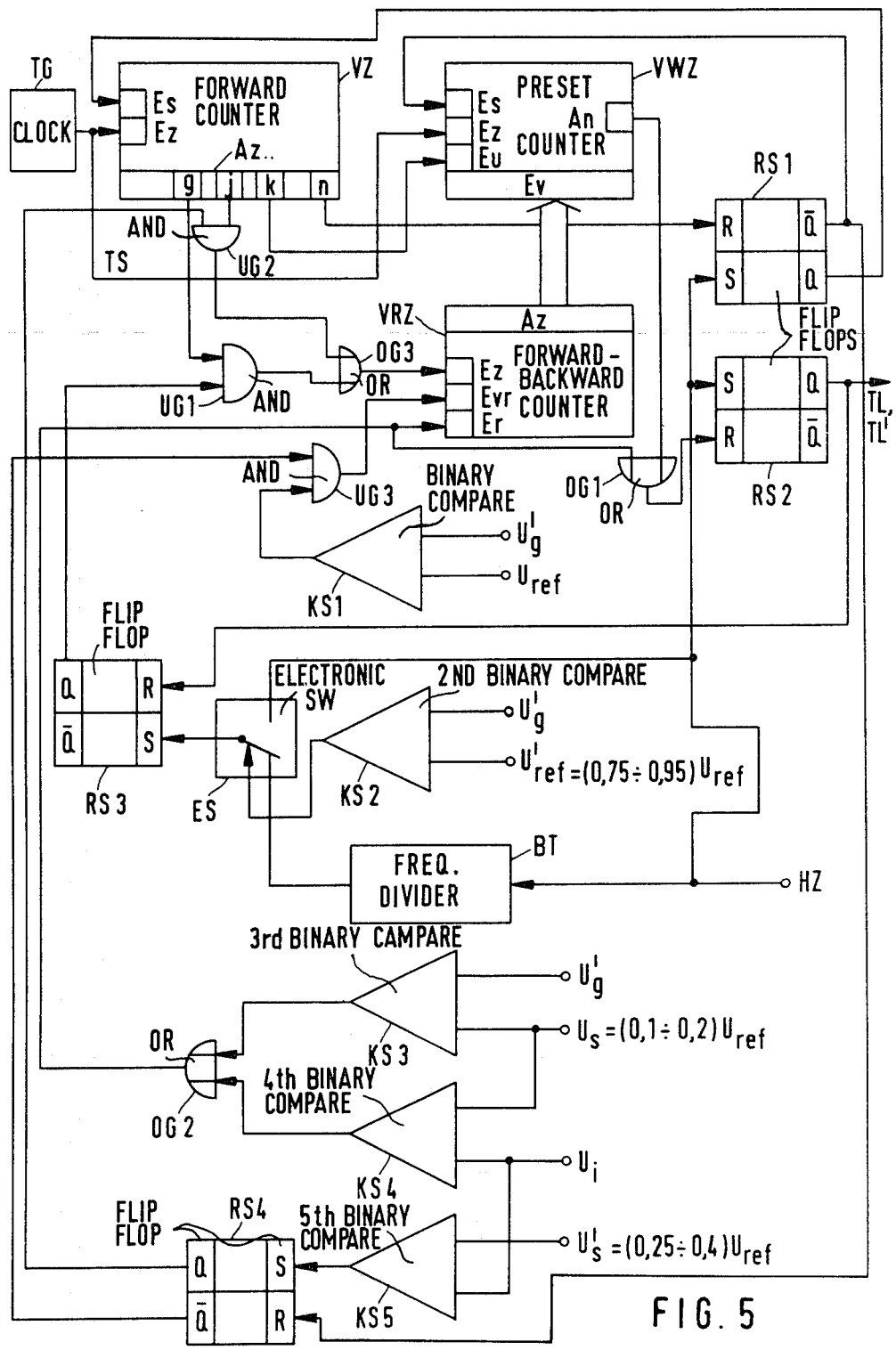
FIG. 5 shows a further embodiment of the arrangement according to FIG. 4 including an additional circuitry for providing the aforementioned protection in the case of overload/short-circuit within the load.

FIG. 5 shows a further variation of the arrangement of FIG. 4 which, in addition to the regulating-loop protection, offers protection in the case of a load short-circuit and consequent current overload of the power supply output. For this purpose there are provided the additional circuit parts, namely the fourth and fifth digital comparator stages KS4 and KS5, the fourth RS flip-flop RS4, the second and third OR-gates OG2, OG3, as well as the second and third AND-gates UG2, UG3. The second OR-gate OG2 may be omitted in cases where the regulating-loop protection with the aid of the third comparator stage KS3 is not required.

The fourth and fifth comparator stages KS4, KS5 serve to compare the fixed voltage $U_s$ of the first voltage threshold or the fixed voltage $U'_s$ of a second voltage threshold with the load-current proportional voltage $U_i$, respectively, (see FIG. 1). Relative thereto, the fixed voltage $U'_s$ of the second voltage threshold amounts from 0.25 to 0.4 times the reference voltage $U_{ref}$. The output of the fourth comparator stage KS4 is connected to that of the third comparator stage KS3 via the second OR-gate UG2 and thus leads to the reset input Er of the forward/backward counter VRZ. Accordingly, when the load current exceeds a value corresponding to the second voltage threshold, there is effected an immediate readjustment to the minimum pulse width of the pulse-width modulated signal as also resulted in the aforementioned regulating loop short-circuit device.

By means of the fifth comparator stage KS5, and in a load-current range between the maximum load current as given by the first voltage threshold $U_s$, and the load current given by the second voltage threshold $U'_s$, there is achieved a stepwise reduction of the pulse width of the pulse-width modulated signal. For this purpose, the fifth comparator stage KS5 compares the fixed voltage value $U'_s$ of the second voltage threshold with the load-current-dependent voltage $U_i$. The output of the fifth comparator stage KS5 is connected to the S-input of the fourth RS flip-flop RS4 whose R-input is connected to the Q-output of the first RS flip-flop RS1. The Q-output of the fourth RS flip-flop RS4 is applied to one input of the second AND-gate UG2, the other input of UG2 being connected to a further counter reading output (j of Az) of the forward counter VZ. The output of UG2 is applied to the one input of the third OR-gate OG3. This OR-gate OG3 is inserted with its other input/output circuit into the connecting line between the output of the first AND-gate OG1 and the counting input Ez of the forward/backward counter VRZ.

Accordingly, when the load current $I_L$ is in the range between the current values corresponding to the two voltage thresholds $U_s$, $U'_s$, then, in addition to the output signal at the counter reading output (g of Az), the further pulse at the counter reading output (j of Az) of the forward counter VZ is applied to the counting input Ez of the forward/backward counter VRZ. That is, the forward/backward counter VRZ is counted at double the frequency applied in the backward direction. Accordingly, in each line the pulse-width reduction speed is double that provided in a normal regulating operation.

The Q-output of the fourth RS flip-flop RS4 is AND-combined in UG2 with the output signal of the first comparator stage KS1 by means of the third AND-gate UG3, which implies that, independently of the output signal of the comparator stage KS1, the forward/backward counter VRZ can count in the backward direction only as long as the comparator stage KS5 detects an excessive current in proportion to the $U'_s$ threshold.

Accordingly, the device of the invention is broadly designed to meet the requirements placed on a television receiver switching regulator. Especially when utilizing the embodiment of FIG. 5, it is adapted to protect in a variety of operating conditions and faults. In view of the principle underlying the invention, i.e. of dividing the pulse duration of the pulse-width modulated signal into two modes, i.e. minimum pulse duration and variable (controlled) pulse duration every faulty operation (depending on its seriousness), leads to a reduction of the momentary pulse width either immediately or at double the speed of change.

It is within the scope of the invention to reduce the pulse width in special cases not only at double the speed of change but also at correspondingly higher rates by utilizing further output pulses of the forward counter VZ.

By making use of the principle underlying the invention and by using further comparator stages, it is also possible to realize still further protective functions for the power supply unit. For example, disconnection of the power supply unit after a certain number of faulty operations can be effected.

In a practical case, the maximum width of the pulse-width modulated signal amounts to 44.8 μs, and the minimum pulse width to 1.5 μs, while the pulse width in the regulated state ranges between 26 and 32 μs. The disconnect delay upon response of the described protective circuits is about 1 μs.

Owing to the fact that the circuit according to the invention operates exclusively with digital circuits, it is particularly suitable for being integrated into existing circuits with the aid of insulated-gate field-effect transistors, i.e. for such circuit integration in accordance with the so-called MOS-technique. Of course, it is also possible to employ bipolar integrating techniques which are particularly suitable for digital circuits, i.e. for example, the so-called integrated injection logic technique ($I^2L$- circuits), or realization with the aid of other bipolar digital circuit families.

In cases where the frequency divider BT according to FIGS. 3 to 5 is designed as a 5-stage binary divider, the variation speed during the starting range amounts to +56 ns per 32 lines. The variation speed of the load-current limitation amounts to −112 ns per line.

What is claimed is:

1. A device implementable in and as part of integrated circuitry for regulating a d.c. supply voltage, particularly in a television receiver, said device including a power semiconductor device, the conduction duty cycle of which is controlled by a pulse-width modulated signal having a duration which is a function of the deviation of said regulated supply voltage from a reference voltage comprising:

comparison means responsive to said regulated voltage and a reference for generating a binary output signal having a first value when said reference exceeds said regulated voltage and having a second value when said regulated voltage exceeds said reference;

a source of clock pulses and forward and preset counter responsive thereto;

a forward/backward counter responsive to an output of said forward counter and said comparison means to count forward when said comparison means output has said first value and backward when said comparison means output has said second value;

a preset counter responsive to said forward/backward counter, said clock pulses, a predetermined count in said forward counter and an enabling pulse to control the count therein, to a value corresponding to the duration of said pulse-width modulated signal; and flip-flop means responsive to a second predetermined count in said forward counter, a zero-crossover signal from said preset counter and the horizontal sync pulses of an associated television receiver, to generate said pulse-width modulated signal as an output to control said power semiconductor conduction duty cycle, and to generate and apply reset pulses to said forward counter and said preset counter.

2. A device implementable in and as a part of an integrated circuit for regulating d.c. supply voltages, particularly in television receivers, said device employing switching-regulator principles with a power-switching semiconductor device being periodically switched on and off by a signal which is pulse-width modulated as a function of a nominal/actual comparison performed during each line period in synchronism with the line frequency, comprising:

means for generating said pulse-width modulated signal including digital circuits responsive to controllable sub-multiples of a clock signal;

comparison means including a first digital comparator stage having a first input responsive to a first reference voltage and to the second input responsive to a voltage which is in proportion to the regulated voltage, the output of said comparator comprising a binary signal, with the two possible values of said binary signal corresponding to the input signal ranges $U_{ref} > U'_g$ or $U_{ref} > U'_g$ respectively;

means providing said clock signal and supplying its pulses to the counting input of a forward counter having a counting capacity n, and to the counting input of a preset counter, one of the counter reading outputs of said forward counter being connected to the counting input of a forward/backward counter whose switching input controlling the selection of forward/backward counting, being responsive to the output of a first comparator stage, the counter reading outputs of said forward/backward counter being applied to the presetting inputs of said preset counter;

means connecting the enable input of said preset counter from one of the other counter reading outputs of said forward counter;

first and second RS flip-flops and means connecting the R-input of a first RS flip-flop from the n-th counter reading output of said forward counter and the Q-output thereof to the enabling input of said forward counter, the $\overline{Q}$-output of said first flip-flop being connected to the starting input of said preset counter;

means applying the horizontal sync pulses of said television receiver to the S-inputs of said first and second RS flip-flops;

a zero-crossing output from said preset counter and means connecting it to the R-input of said second RS flip-flop, the Q-output of said second RS flip-flop serving as the output for said pulse-width modulated signal.

3. A circuit arrangement according to claim 2, further comprising:

a second digital comparator stage connected to compare a fraction of said regulated voltage with a second reference voltage amounting to approximately 0.75 to 0.95 times said first reference voltage, a frequency divider and an electronic switch, the output of said second comparator stage being applied to the switching control input of said electronic switch, said horizontal sync pulses being applied to one signal input of said electronic switch, the other signal input of said electronic switch receiving the output of said frequency divider, said horizontal sync pulses being fed to said frequency divider input;

means connecting the output of said electronic switch to the S-input of a third RS flip-flop whose R-input is connected from the Q-output of said second RS flip-flop, and a first AND-gate receiving on one input the Q-output of said third RS flip-flop the other input-output circuit of said first AND-gate being inserted into the connecting line between said one of the counter reading outputs of said forward counter and the counting input of said forward/backward counter.

4. A circuit arrangement as claimed in claims 2 or 3, comprising:

a third digital comparator stage connected to compare said fraction of said regulated voltage with the fixed voltage of a first voltage threshold amounting to approximately 0.1 to 0.2 times said first reference voltage ($U_{ref}$); and means connecting the output of said third comparator stage to the reset input of said forward/backward counter and to one input of a first OR-gate which, has its other input-output circuit inserted into the connecting line between said zero-crossing output of said preset counter and the R-input of said second RS flip-flop.

5. A circuit arangement as claimed in claim 4, further comprising:

a fourth digital comparator stage for comparing said first voltage threshold, amounting to approximately 0.1 to 0.2 times the said first reference voltage, with a voltage which is in proportion to the load current of said regulated voltage, said voltage ($U_i$) which is in proproportion to said load current, being taken from the tapping point of a voltage divider consisting of a current-measuring resistor in the load circuit and applied to ground and of a further resistor connected from the terminal of said current-measuring resistor (RI1) not grounded, to said regulated voltage;

the output of said fourth comparator stage being applied to the one input of a second OR-gate which, with its other input-output circuit, is inserted into the connecting line between the output of said third comparator stage and said reset input of said forward/backward counter (VRZ);

a fifth digital comparator stage connected to compare the voltage of a second voltage threshold amounting to approximately 0.25 to 0.4 times said first reference voltage, with said voltage which is in proportion to said load current, the output of said fifth comparator stage being applied to the S-input of a fourth RS flip-flop whose R-input is connected to the $\overline{Q}$-output of said first RS flip-flop;

means applying to an input of a second AND-gate the Q-output of said fourth RS flip-flop, the other input of said second AND-gate being connected from a further counter reading output of said forward counter;

a third OR-gate having one input connected to the output of said second AND-gate and its other input-output circuit connected in series with the counting input of the forward/backward counter; and means connecting the $\overline{Q}$-output of said fourth RS flip-flop to an input of a third AND-gate which, with its other input/output circuit is inserted into the connecting line extending between the output of said first comparator stage and the switching input of said forward/backward counter.

* * * * *